UNITED STATES PATENT OFFICE

HERMANN STAUDINGER, OF FREIBURG, GERMANY, AND THADEUS REICHSTEIN, OF ZURICH, SWITZERLAND, ASSIGNORS TO FIRM INGA INTERNATIONALE NAHRUNGS- UND GENUSSMITTEL AKTIENGESELLSCHAFT, OF SCHAFFHAUSEN, GERMANY

METHOD OF PRODUCING MERCAPTANS OF THE FURFURYL SERIES

No Drawing. Original application filed July 22, 1927, Serial No. 207,814, and in Germany December 16, 1926. Divided and this application filed June 9, 1928. Serial No. 284,274.

The present invention relates to the production of mercaptans of the furfuryl series and is a division of application Ser. No. 207,814, filed July 22, 1927, Patent No. 1,715,795, dated June 4, 1929.

The subject matter of the present invention is a method of producing α-hydroxy-methyl-furfuryl-mercaptan and the novel product obtained.

The α-hydroxy-methyl-furfuryl-mercaptan of the formula

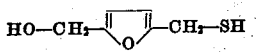

may be produced from the corresponding disulphide by reduction or directly from the corresponding furfural by converting the latter by means of an alkaline sulphide compound for instance ammonium-sulph-hydrate, $NH_4SH$ or sodium-sulph-hydrate $NaSH$, into the disulphide and reducing the latter without isolating it to mercaptan.

Example 1

α-hydroxymethyl-furfuryl-disulphide, a solid substance having a melting point of 136-137° C. after it has been recrystallized from alcohol, is dissolved in alcohol and acted upon by amalgamated aluminium in powder form. Thereby the reduction to α-hydroxy-methyl-furfuryl-mercaptan is caused. The latter is purified by vacuum-distillation after it has been removed by means of solvents and is obtained as a viscid oil having a boiling point of about 106° C. at a pressure of 2 mm. mercury. The product has a peculiar unpleasant mercaptan odour.

Example 2

To α-hydroxymethyl-furfurol in a concentrated alcoholic solution ammonium-sulph-hydrate is added, thereby a reaction starts causing a rise of temperature and this reaction is terminated by introducing sulphide of hydrogen. After standing for approximately a day the bulk of α-hydroxymethyl-disulphide crystallizes. The latter is filtered and without further purifying is absorbed in alcohol and reduced with activated aluminium (amalgamated aluminum powder). The reduction may also be carried out in a solution of ether, however, sufficient solvent must be added as the disulphide is reluctantly soluble in ether.

We claim:

1. The herein described product consisting of α-hydroxy-methyl-furfuryl-mercaptan, the same being a viscid oil having a boiling point of about 106° C. at 2 C. at 0.5 mm. mercury and possessing a peculiar unpleasant mercaptan odour.

2. The process of producing α-hydroxy-methyl-furfuryl-mercaptan, which consists in subjecting α-hydroxy-methyl-furfuryl-disulfide to the action of a reducing agent.

3. The process of producing α-hydroxy-methyl-furfuryl-mercaptan, which consists in converting α-hydroxy-methyl-furfuryl into α-hydroxy-methyl-furfuryl-disulfide by causing it to react with an alkaline sulphide compound, and subjecting the disulphide obtained, without isolating it, to the action of a reducing agent.

4. The process of producing α-hydroxy-methyl-furfuryl-mercaptan, which consists in converting α-hydroxy-methyl-furfural into α-hydroxy-methyl-furfuryl-disulphide by causing it to react with a soluble salt of hydrogen sulphide, and subjecting the disulphide obtained, without isolating it, to the action of a reducing agent.

5. The process of producing α-hydroxy-methyl-furfuryl-mercaptan, which consists in converting α-hydroxy-methyl-furfural into α-hydroxy-methyl-furfuryl-disulphide by causing it to react with ammonium-sulpho-hydrate and terminating the reaction by introducing sulphide of hydrogen, and subjecting the disulphide obtained, without isolating it, to the reducing action of activated aluminium.

In testimony that we claim the foregoing as our invention, we have signed our names.

HERMANN STAUDINGER, Ph. D.
THADEUS REICHSTEIN, Ph. D.